United States Patent [19]
Bruins et al.

[11] Patent Number: 5,529,451
[45] Date of Patent: Jun. 25, 1996

[54] SELF-SUPPORTING ROOFING NAIL

[75] Inventors: Roger C. Bruins, Jenison; Glenn T. Korhorn, Ada, both of Mich.

[73] Assignee: National Nail Corp., Grand Rapids, Mich.

[21] Appl. No.: 320,504

[22] Filed: Oct. 7, 1994

[51] Int. Cl.⁶ .............................. F16B 15/00; F16B 15/02
[52] U.S. Cl. ........................ 411/482; 411/441; 411/923
[58] Field of Search .................................... 411/440, 441, 411/469, 480, 482, 923

[56] References Cited

U.S. PATENT DOCUMENTS

| | | |
|---|---|---|
| 2,014,814 | 9/1935 | Reiter . |
| 2,048,234 | 7/1936 | Tucker . |
| 2,293,743 | 8/1942 | Miles et al. . |
| 2,412,744 | 12/1946 | Nelson . |
| 2,878,845 | 3/1959 | Hale . |
| 3,320,845 | 5/1967 | Eschweiler ............................. 411/441 |
| 3,436,883 | 4/1969 | Charman, Jr. et al. . |
| 3,495,368 | 2/1970 | Krause . |
| 3,618,445 | 11/1971 | Hartmann et al. ...................... 411/441 |
| 3,921,495 | 11/1975 | Braun et al. . |
| 4,261,402 | 4/1981 | Stanaitis . |
| 4,432,289 | 2/1984 | Norman et al. . |
| 4,915,561 | 4/1990 | Buhri et al. . |
| 5,082,412 | 1/1992 | Thomas . |
| 5,110,247 | 5/1992 | Losada ................................... 411/441 |
| 5,178,503 | 1/1993 | Losada . |

FOREIGN PATENT DOCUMENTS

| | | | |
|---|---|---|---|
| 1047890 | 12/1953 | France ................................... 411/441 |
| 1603703 | 9/1970 | Germany ............................... 411/441 |
| 2504816 | 8/1975 | Germany ............................... 411/441 |

Primary Examiner—Neill R. Wilson
Attorney, Agent, or Firm—Waters & Morse

[57] ABSTRACT

An improved roofing nail having a cap which is held captive near the nail point for the purpose of attaching roofing felt to a wooden roof. The nail point extends slightly below the lower surface of the cap allowing the point of the nail to be manually engaged into the roofing felt. The cap positioned at the end of the nail provides support to hold the nail in an upright position until the nail is driven through the cap and into engagement with the roof substructure, after the hand of the user has been removed.

7 Claims, 2 Drawing Sheets

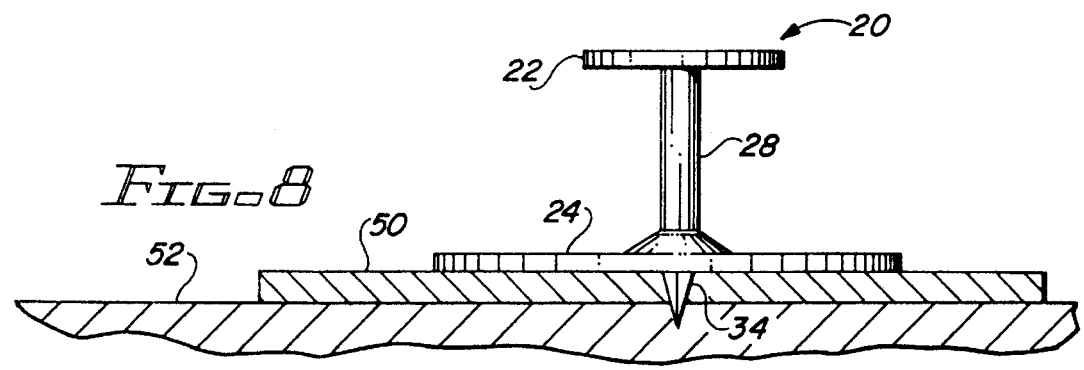
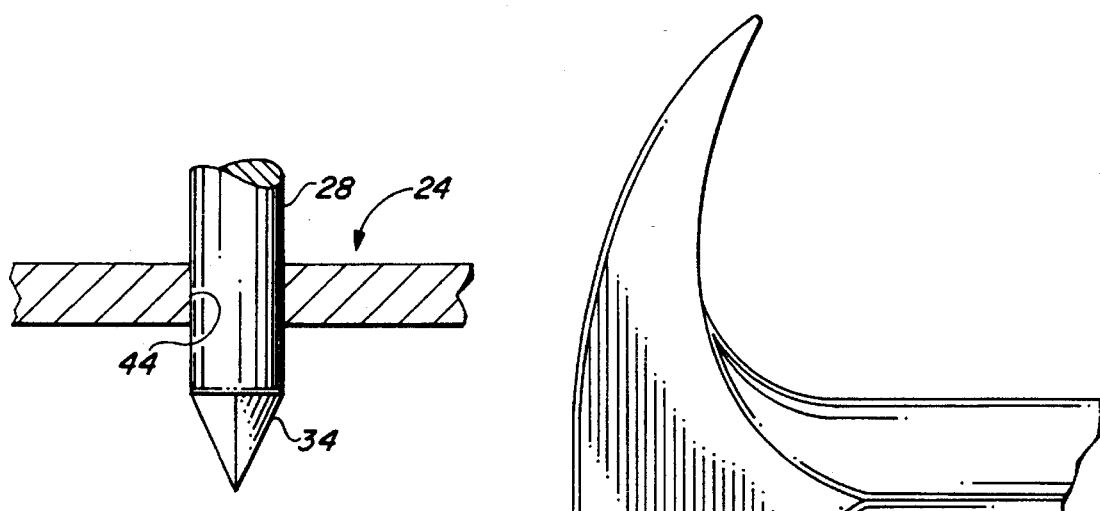
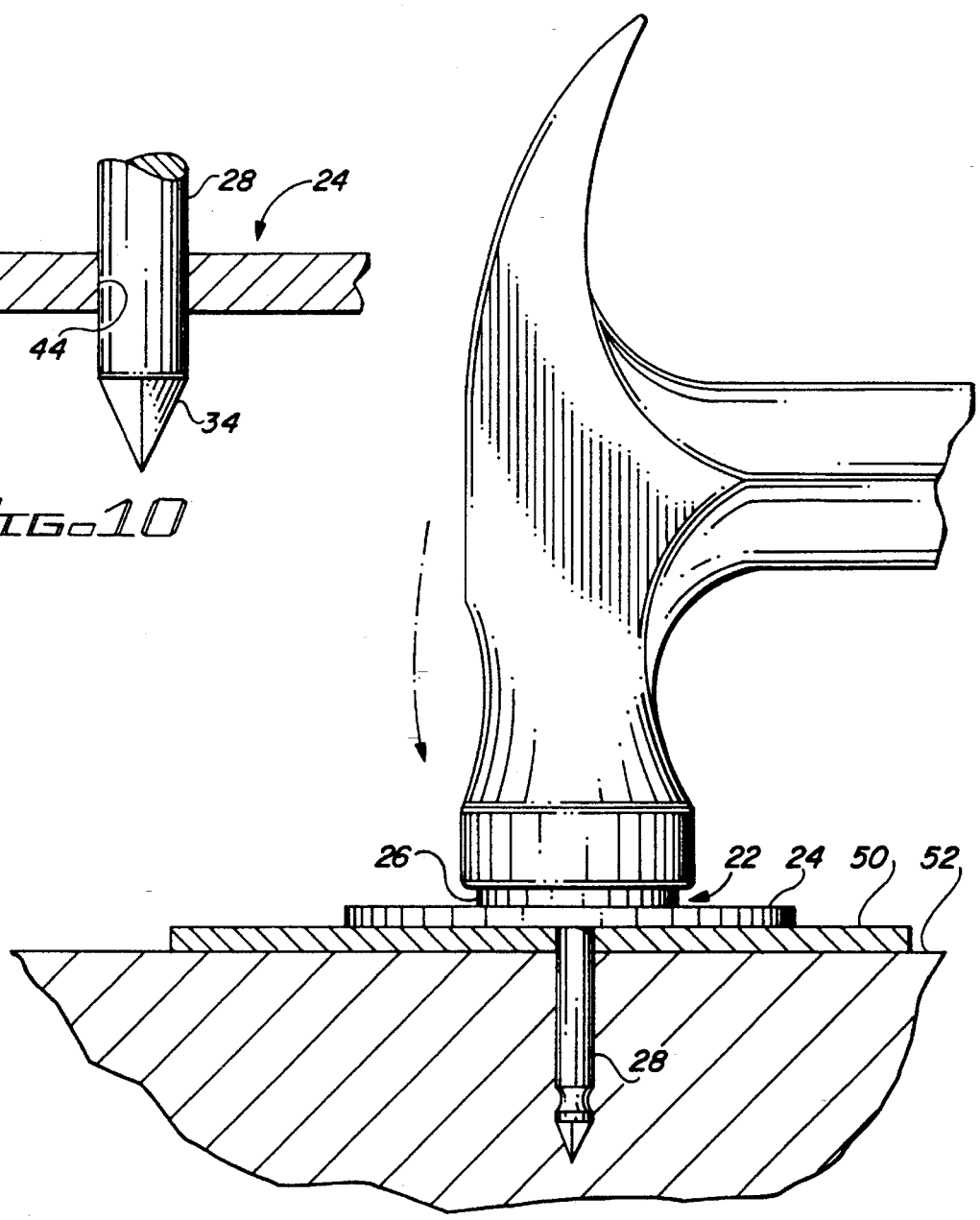

SELF-SUPPORTING ROOFING NAIL

BACKGROUND OF INVENTION

This invention relates to an improved roofing nail, specifically a self-supporting roofing nail for use in fastening roofing felt to a wooden roof substructure.

Roofing felt, or tar paper as it is commonly called, is a material widely used in the construction industry to weatherproof the roof of a building. Typically, a wooden substructure is constructed to form the roof line of a building. The substructure includes a covering of sheets of plywood or similar wooden material over the roof trusses. Roofing felt is then applied over the wooden substructure in a layered fashion from the bottom of the roof to the top. Finally, shingles or some similar material is applied over the roofing felt to complete the roofing process. A roof constructed of roofing felt and shingles provides a very effective weather resistant covering to a building.

Roofing felt is not necessarily a strong material. The advantage of roofing felt is its ability to resist moisture penetration. Thus, it is used as a moisture barrier between the wooden substructure of the roof and the shingles. It will fail quite easily under shear or tension stresses applied to it. Consequently, when applying roofing felt to a roof the installer must use a special type of nail which will have a relatively large bearing area over the roofing felt. A common nail or even a roofing nail has a head which is too small to prevent the nail head from penetrating the felt. A large bearing area prevents the nail head from penetrating the felt and compromising the moisture resistant characteristic of the roofing felt.

The type of nail which is most commonly used in applying roofing felt is a cap nail. A cap nail is typically a two-piece nail. The fist component is a straight shanked roofing nail with a formed flat head perpendicular to the shank of the nail. The second component is the cap which is essentially a flat plate substantially larger than the head of the nail. The cap has a hole in the middle through which the shank of the nail is disposed and the cap, usually made of metal, is wedged on the nails adjacent the head of the nail.

Traditionally, when applying the roofing felt to the wooden roof substructure, the carpenter inserts the nails in the roof by holding the nail with his fingers and tapping the nail until it becomes seated, and then hitting the nail hard to force it into the roof. Generally, the carpenter tries to release the nail just before he hits it with a hammer so that his fingers do not get struck by the hammer.

There are several disadvantages to using this type of roofing nail. First, because of the large cap wedged adjacent the nail head, a carpenter must reach under the cap with his fingers and hold the nail while seating it with a hammer. Typical roofing nails are one inch or less in length. Thus, using fingers to hold the nail shank under the cap on such a short nail becomes relatively difficult for the carpenter. The carpenter also has difficulty in removing his fingers from the nail in time to avoid being caught by the hammer and cap when the nail is being driven thereby risking injury to fingers. Second, if a carpenter removes his fingers too soon and the nail tips over, the nail is poorly driven and must be removed and discarded, therefore wasting time and materials. This occurs on as many as 25% of the roofing nails installed. Third, when a nail is driven poorly, the defect may be concealed by the cap. Thus, a poorly driven nail may be left in the roof and not properly performing the function for which it was designed. Since a defectively driven nail cannot be identified by visual inspection, many of these nails stay on the roof only partially holding the roofing felt. Such a condition can cause roof felt failure by being blown off by wind.

In view of the above problems as well as other considerations, it is believed that an improved roofing nail should provide at least some of the following advantages: The ability to be easily seated and driven on the roofing felt without endangering injury to the carpenter's fingers, a low rate of improper installation, and the ability to be easily inspected for proper installation. Therefore, the purpose of the present invention is to improve the design and construction of a roofing nail to incorporate these advantages.

SUMMARY OF THE INVENTION

The improved roofing nail according to the present invention utilizes a groove around the shank of the nail onto which a flat metal cap is disposed and held captive near (preferably approximately one-eighth inch from) the point of the nail.

The roofing nail is used to attach roofing felt to a wooden roof substructure. Because of the fragile nature of the roofing felt, it is easily torn and therefore requires a cap on the roofing nail to provide a larger area to bear on the surface of the roofing felt decreasing the probability of inducing a tear in the felt.

The metal cap is positioned perpendicular to the longitudinal axis of the nail. By captively holding the metal cap near the nail point, the nail point can be manually engaged into the roofing felt to hold the roofing nail in its desired position. The metal cap in turn acts as a base for supporting the nail in an up-right position until the nail is driven into engagement with the roof's wooden substructure. The self-supporting nature of the roofing nail prevents possible injury to the carpenter's fingers as a result of being accidentally struck with a hammer while driving the nail. Additionally, the location of the cap near the point of the nail promotes an accurate inspection of the installed nail to determine if the nail has been improperly driven.

The objective of this invention is twofold. First, to provide a roofing nail for attaching roofing felt to a wooden substructure whereby the difficulty of holding a short nail under a large diameter cap is alleviated. Secondly, to provide a roofing nail which displays a higher degree of successful engagement with the roof than the previous art and is readily inspected by visual means for improper installation.

DESCRIPTION OF THE DRAWINGS

FIG. 8 is a side view of the roofing nail "set" on roofing felt in a self-supporting manner.

FIG. 9 is a side view of the roofing nail being driven into the roofing felt and the underlying wood roof.

FIG. 10 is an enlarged view of the nail point showing an alternate embodiment utilizing an interference fit between the nail and cap.

DESCRIPTION OF THE PREFERRED EMBODIMENTS

Figure 1:
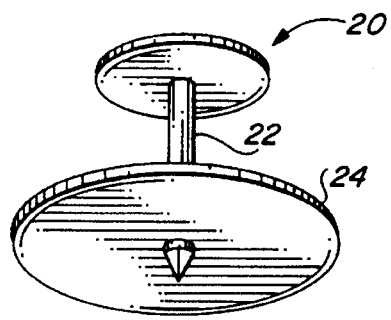
FIG. 1 is an isometric view of the improved roofing nail showing the cap held captive near the point of the nail.
Figure 2:
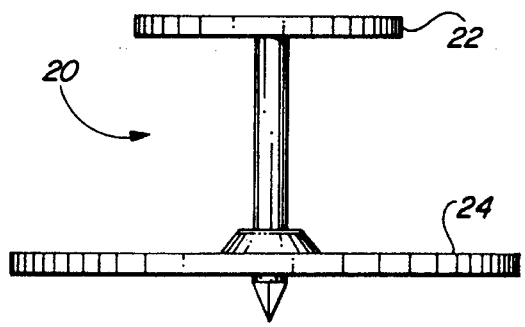
FIG. 2 is a side view of the improved roofing nail.

Referring to the drawings and more particularly to FIGS. 1–2, an improved roofing nail 20 is provided in accordance with the present invention. The roofing nail is comprised of a straight shanked nail 22 and a cap 24.

Figure 3:
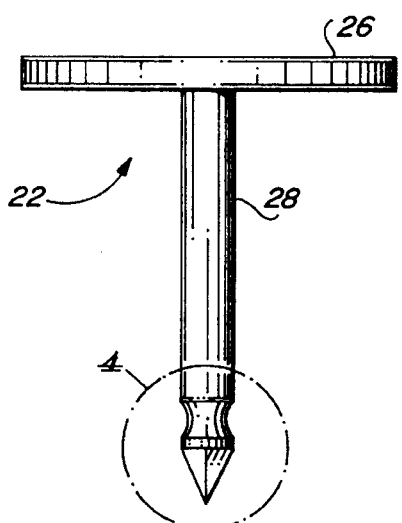
FIG. 3 is a side view of the nail with a groove around the lower end of the nail shank.
Figure 4:
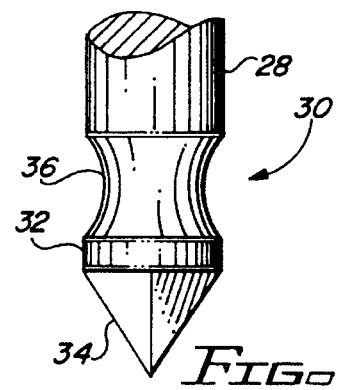
FIG. 4 is an enlarged view of the nail point showing more clearly the groove around the shank.

Referring to FIG. 3, the nail 22 has a straight shank 28 and a flat head 26 formed at one end of the nail. The flat head 26 is of significantly larger diameter than the nail shank 28. The opposite end of the nail is formed into a point 34 which is more clearly shown in FIG. 4. Immediately above the point 34 is a shoulder 32 which separates the point from an annular groove 30. The annular groove 30 is located close to the nail point 34 and ideally approximately one-eighth inch from the nail point 34. The annular groove 30 extends circumferentially around the nail shank 28 such that the diameter of the groove trough 36 is slightly smaller than the diameter of the nail shank 28.

Figure 6:
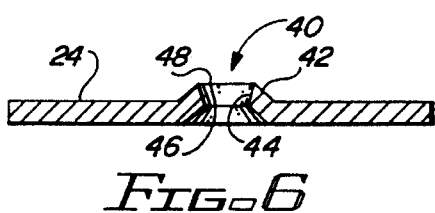
FIG. 6 is a sectional view of the cap showing the retention feature of the cap.
Figure 5:
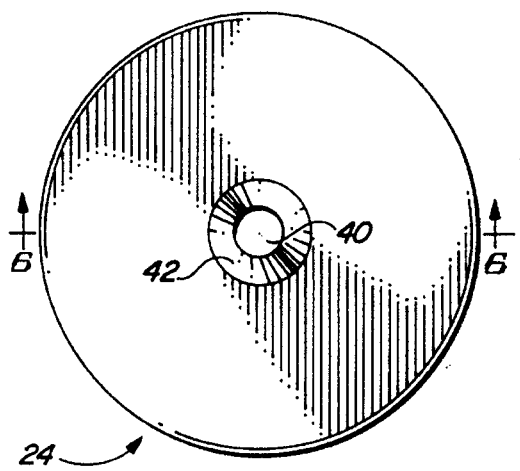
FIG. 5 is a top view of the cap through which the nail is disposed.

Referring to FIGS. 5–6, the cap 24 is relatively flat and its outside dimension is significantly larger than the diameter of the nail head 26. The cap 24 may be of any shape and is shown in this embodiment as being circular for illustrative purposes only. An aperture 40 through the cap 24 is located essentially at the center of the cap 24. The aperture 40 is defined by aperture walls 44. The diameter of the aperture is slightly smaller than the diameter of the nail shank 28 and essentially equal to the diameter of the groove trough 36 on nail shank 28. The area around the aperture 40 is formed to create a raised dimple area 42. The raised dimple 42 forms a aperture wall 44 into the shape of an inverted frustum. The upper aperture edge 46 having a larger diameter than the lower aperture edge 46 facilitating the insertion of the nail 22 into the cap aperture 40.

Figure 7:
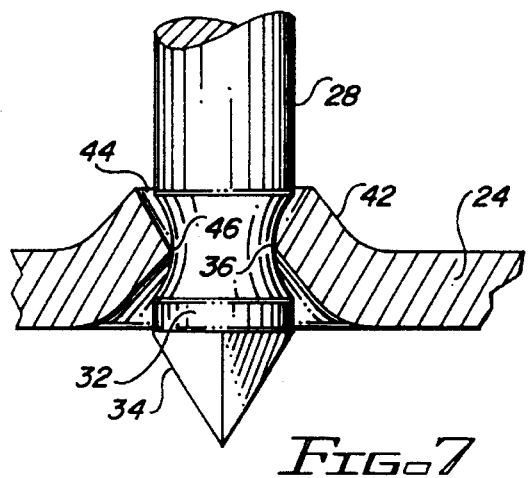
FIG. 7 is an enlarged view of the nail point showing the cap engaged in the groove around the shank.

FIG. 7 shows the nail point 34 inserted into cap aperture 40 and axially disposed through the aperture 40 until the lower aperture edge 46 comes into engaging relationship with the annular groove 30. Since the diameter of the aperture edge 46 is smaller than the nail shank diameter 28 and the aperture edge 46 has not been plastically deformed, the cap 24 is retained substantially close to the nail point 34. The engaging relationship between the nail 22 and the cap 24 permits the roofing nail to be pre-assembled and readily handled by the carpenter without danger of the two pieces becoming separated prior to insertion into a roof structure.

FIG. 8 shows the roofing nail assembly 20 placed on a layer of roofing felt 50 prior to being driven into the roof substructure 52. The carpenter manually places the roofing nail 20 onto a desired location on the roofing felt 50. The carpenter then applies a slight downward pressure on the roofing nail 20 thereby engaging the nail point 34 into the roofing felt until the cap 24 is in surface engagement with the roofing felt 50. The carpenter then removes his fingers. The slight penetration of the nail point 34 is sufficient to hold the roofing nail 20 in place on the roofing felt 50. The cap 24 supports the nail 22 in an upright position allowing the carpenter to drive the nail into the roof's substructure 52.

FIG. 9 shows a hammer driving the nail 22 through the cap aperture 40 and into the roof substructure 52 until the nail head 26 is in surface contact with the cap 24. If the nail 22 is improperly driven such that it is bent or otherwise possesses an installation defect, the condition will be readily visible above the cap 24 in this invention as opposed to being hidden under the cap 24 in the prior art.

FIG. 10 shows an alternate embodiment of the invention whereby the diameter of the aperture 40 in cap 24 is of a slightly smaller diameter than the nail shank 28. Cap 24 is then wedged onto the nail shank 28 approximately one-eighth inch from the nail point 34. The smaller aperture diameter creates an interference between the cap aperture wall 44 and the nail shank 28 thereby holding the cap 24 captive on the nail shank 28 until the roofing nail is installed in the manner described below.

The embodiments of the present invention in which an exclusive property or privilege is claimed are defined as follows:

1. In a roofing nail comprising a shank having a head on one end and a pointed end on a second end and a relatively flat cap having a central aperture through which the nail shank is slidably disposed, the improvement comprising:

cap retention means for releasably retaining the cap in a pre-determined axial position on the shank of the nail near the pointed end of the nail, such that the nail is self-supported in a relatively upright position by the pointed end and the cap when the pointed end is inserted into a layer of roofing felt, the cap retention means being an annular groove in the nail shank proximately located to the pointed end of the nail, the aperture in the cap being slightly smaller than the diameter of the nail shank and being resiliently enlargeable, such that the cap resiliently fits over the second end of the nail and clips in the groove, the cap being released from the groove and sliding toward the head of the nail when the nail head is struck with a hammer so as to drive the pointed end of the nail into a penetratable substrate.

2. A roofing nail as described in claim 1 wherein the annular groove is located approximately one-eighth inch from the sharpened end of the nail.

3. In a roofing nail comprising a shank having a head on one end and a pointed end on a second end and a relatively flat cap having a central aperture through which the nail shank is slidably disposed, the improvement comprising:

cap retention means for releasably retaining the cap in a pre-determined axial position on the shank of the nail near the pointed end of the nail, such that the nail is self-supported in a relatively upright position by the pointed end and the cap when the pointed end is inserted into a layer of roofing felt, the cap retention means comprising an annular groove approximately the same size as the cap aperture but slightly smaller than the diameter of the nail shank, such that an interference fit is created between the cap and the nail shank.

4. A roofing nail according to claim 3 wherein the cap is metal and is domed around the periphery of the cap aperture, such that the portion of the cap adjacent the aperture is at a skewed, non-perpendicular angle with respect to the axis of the nail shank.

5. A roofing nail according to claim 2 wherein one of the groove or the portion of the cap forming the periphery of the cap aperture includes a cam surface that urges the cap aperture to deflect outwardly from the groove onto the nail shank when the nail is moved axially with respect to the cap in a direction toward the pointed end.

6. In a roofing nail comprising a shank having a head on one end and a pointed end on a second end and a relatively flat cap having a central aperture through which the nail shank is slidably disposed, the improvement comprising:

cap retention means for releasably retaining the cap in a pre-determined axial position on the shank of the nail near the pointed end of the nail, such that the nail is self-supported in a relatively upright position by the pointed end and the cap when the pointed end is inserted into a layer of roofing felt, the cap retention means comprising an indentation in the nail shank adjacent the pointed end, the cap aperture being deformable and sized such that the cap clips into engagement with the indentation and is releasably held by such engagement at the predetermined axial position on the nail, the cap being maintained in a plane substantially perpendicular to the axis of the nail, the length of the nail between the cap and the pointed end being sufficient to permit the pointed end of the nail to be inserted easily into roofing felt up to a penetration depth where the cap engages the roofing felt, the amount of such penetration being sufficient that the nail in the penetration position is self-supporting and remains upright without being held manually in place, thus making it possible to let go of the nail before it is driven fully into the roof.

7. In a roofing nail comprising a straight shanked nail having a flat head on one end and sharpened end on the opposite end and comprising a relatively flat metal cap having a central aperture through which the nail shank is disposed, the improvement comprising:

an annular groove located approximately one-eighth inch from the sharpened end of the nail and being disposed around the shank of the nail;

the metal cap central aperture being slightly smaller than the dimension of the nail shank and formed by inner walls of the cap;

the central aperture being sufficiently small that the portion of the metal cap surrounding the cap is releasably disposed in the annular groove of the nail shank in a manner that causes the metal cap to be held in a position that is essentially perpendicular to the shank of the nail.

* * * * *